Aug. 3, 1965  R. H. ELFSTEN  3,198,467
MAGNETICALLY SUPPORTED BRACKET
Filed Dec. 3, 1962
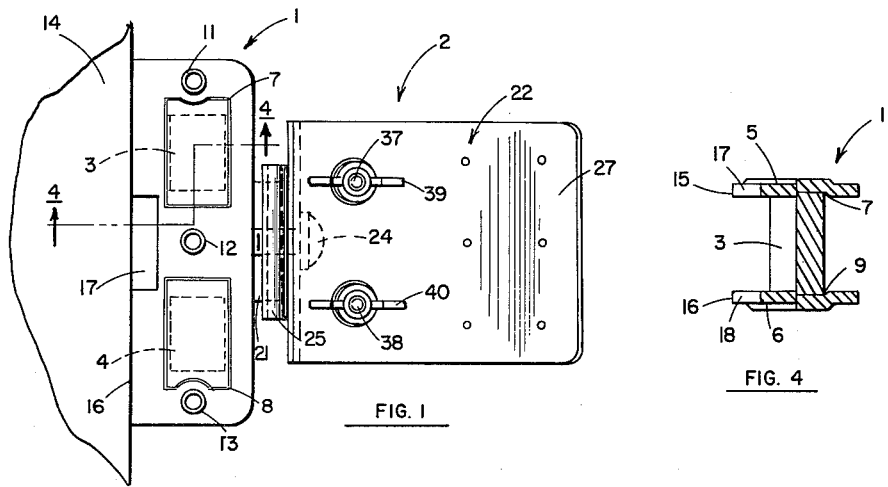
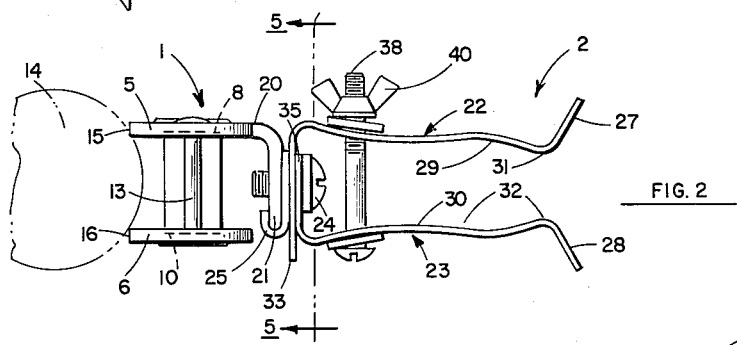
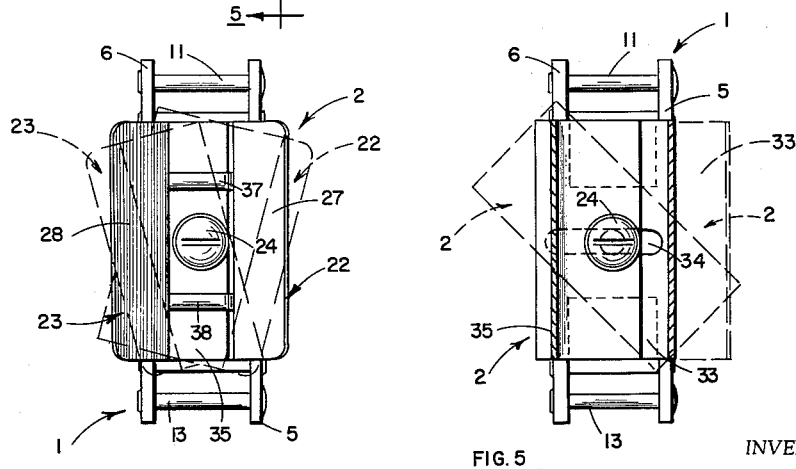
INVENTOR.
ROBERT H. ELFSTEN
BY
ATTORNEY

3,198,467
MAGNETICALLY SUPPORTED BRACKET
Robert H. Elfsten, Los Angeles, Calif., assignor to Bestools, Inc., Lynwood, Calif., a corporation of California
Filed Dec. 3, 1962, Ser. No. 241,805
3 Claims. (Cl. 248—206)

This invention pertains to a supporting device particularly adapted to serve as a temporary means to retain welder's equipment or other objects.

While having general applicability, the device of this invention is especially useful in the welding trade. Welders long have been plagued with the problem of temporary storage of welding equipment when it is not in actual service. Welders customarily work under field conditions where it is entirely impractical to provide a permanent supporting means for the welding torch, electrode holder, or the like. The welder may be at a location some distance from the supply tanks or other larger equipment items normally furnished. As a result, when not actually engaged in forming a weld, the torch or electrode holder usually has been placed on the floor or in some other inconvenient location. There it is in the way of workmen in the area, is subject to being damaged, and can constitute a safety hazard.

The present invention alleviates this condition, however, by providing a convenient temporary supporting device that will hold the welder's equipment out of the way in almost any circumstance. This is accomplished by means of a bracket that is secured to adjacent structure by means of strong permanent magnets associated with core pieces that form the flux circuit and support adjustable clamp elements. Wherever welding is accomplished there will be magnetic objects to which the bracket can be applied. Carried by the base of the unit are clamping elements that resiliently grip an object to be retained, and are particularly advantageous in view of a variety of adjustments that can be made. The clamping members are adjustable laterally with respect to each other so that the gripping area may be controlled to suit the particular device to be supported. Additionally, these elements are angularly positionable with respect to each other, as well as with the base of the unit, again so that the optimum support configuration and location may be provided. Moreover, the gripping force of the clamping members can be controlled by means of transversely extending bolts at the lower portions of the clamping elements.

Accordingly, it is an object of this invention to provide an improved magnetically supported bracket.

Another object of this invention is to provide a bracket for holding objects with the bracket having provision for adjustment of the spacing of the gripping elements, their angularity, and the gripping force exerted.

A further object of this invention is to provide a bracket having a secure magnetic attachment to adjacent object, yet which is readily removed when desired.

An additional object of this invention is to provide a temporary supporting device particularly usable in the welding trade.

These and other objects will become apparent from the following detailed description taken in connection with the accompanying drawing in which:

FIG. 1 is a side elevational view of the supporting device of this invention,

FIG. 2 is an end elevational view of the arrangement of FIG. 1,

FIG. 3 is a top plan view of the supporting device,

FIG. 4 is a transverse sectional view taken along line 4—4 of FIG 1, and

FIG. 5 is a longitudinal sectional view taken along line 5—5 of FIG. 2.

With reference to the drawing, the device of this invention is made up of a base portion 1 and a gripping assembly 2 that is adapted to engage the object to be held. The base portion includes a pair of short, yet powerful permanent bar magnets 3 and 4. These members are arranged in spaced parallelism with their longitudinal axes at right angles to core pieces 5 and 6 of magnetic material. The wall of each core piece is recessed to provide a retaining means for the permanent magnets 3 and 4. Hence, core piece 5 includes rectangular indentations 7 and 8, while similar portions 9 and 10 are included on core piece 6. This provides a simple arrangement for properly positioning and firmly holding the magnets between the core pieces 5 and 6. The attachment of the components of the base 1 is completed by three rivet pins 11, 12 and 13 that connect the core pieces together.

It is apparent from the foregoing, therefore, that a magnetic circuit for the flux of the permanent magnets 3 and 4 is formed by the core pieces 5 and 6 together with any adjacent object 14 of magnetic material to which the bracket may be applied. Hence the bracket portion 1 of the supporting device of this invention can be attached almost anywhere by associating the bottom edges 15 and 16 with whatever item of magnetic material may be at hand. As mentioned above, wherever welding is to take place, invariably there are items of steel to which the bracket readily is applied.

While the bracket provides a particularly strong retaining force by virtue of the permanent magnets and the low reluctance flux path furnished for them, nevertheless, it is readily removable from the object 14 to which it is secured. Ease of removal is assured by the inclusion of slots 17 and 18 at the intermediate portions of the bottom edges 15 and 16 of the core pieces. A screwdriver or other tool may be inserted into the slots for prying the bracket away from the object to which it is attached.

Projecting from the mid portion of the upper edge 20 of the core piece 5 is a short section 21 that extends parallel to the magnets 3 and 4 above the two core pieces. Its outer end is spaced from the core piece 6. The element 21 carries on its outer face a pair of resilient clamping members 22 and 23. These may be of spring steel and provide the means for actually gripping an object to be held. They are attached to the base 1 by means of a screw 24 that is received in a tapped opening in the projecting member 21.

The support portion 2 of the bracket of this invention is insulated from the base portion 1 by means of a small strip 25 of nonmagnetic material interposed between the gripping members and the core extension 21. The insulator 25 may be of aluminum sheet material and precludes conduction of an appreciable amount of magnetic flux into the gripping members 22 and 23.

As best seen in FIG. 2, the gripping members 22 and 23 are provided with outwardly flaring distal end sections 27 and 28, thereby defining a wide entrance to direct an object to be supported to the inner portion of these elements. The object, such as the welder's torch or electrode holder, then normally will be gripped between the opposed central portions 29 and 30 of the two clamping members. In further assuring a firm gripping force, a plurality of small protuberances 31 and 32 are included on the two gripping members. These, of course, will give a concentrated frictional force at localized areas on the object being held.

The gripping members 22 and 23 are adjustable to suit almost any condition which will be encountered. To this end the bottom laterally extending leg 33 of the member 22 is provided with an elongated slot 34 through which the shank of screw 24 passes. The corresponding leg 35 of the other gripping member 23, which is shorter than section 33, has only a circular clearance opening for the screw. By this construction, therefore, the member 22 may be adjusted laterally with respect to the other gripping member 23. In this manner the width of the space between portions 29 and 30 may be controlled to suit the particular object to be supported. Thus by a simple one-screw adjustment, the bracket may be custom-fitted for each situation.

This construction with the central pivotal connection to the support element 21 has further advantages. It also permits the two gripping elements 22 and 23 to be angularly positioned with respect to the base portion 1. Such a position may be seen in phantom in FIG. 5. It may be, for example, that the magnetic support portion 1 is most conveniently attached to a horizontally extending relatively narrow element. At the same time, it may be required that the gripping member 22 and 23 be located in a vertical position. The pivotal connection about the screw 24 allows such an adjustment to take place.

The pivotal attachment further allows an angularity to be accomplished between the two gripping members 22 and 23. Hence, they need not be parallel, as illustrated in FIGS. 1 and 2, but may have an angular position with respect to each other. This permits the supporting bracket under all circumstances to achieve an optimum gripping configuration.

An additional adjustment is found in the two spaced parallel bolts 37 and 38 that extend transversely between the gripping members 22 and 23 near the base portions thereof. These bolts, which for convenience of operation, include wing nuts 39 and 40, control the gripping force exerted by the gripping members 22 and 23. For heavy objects, they may be tightened by inward advancement of the wing nuts, limiting the ability of clamps 22 and 23 to bend outwardly and causing these members to secure the object firmly. For lighter or less rugged objects the bolts are loosened so that less clamping force is exerted. The use of two spaced bolts allows this adjustment to take place even when the members 22 and 23 are at a relative angular position rather than being parallel.

From the foregoing, it can be seen that I have provided an improved magnetically supported bracket providing a conveniently used temporary attachment for almost any object that may need to be supported. Great versatility is afforded by the provision of the complete adjustment of the gripping members both as to angularity and to the amount of force exerted.

The foregoing detailed description is to be clearly understood as given by way of illustration and example only, the spirit and scope of this invention being limited solely by the appended claims.

I claim:
1. A supporting device comprising
a base, said base including
a duality of spaced members of magnetic material,
said members having longitudinal edges adapted to engage an object to which said base is to be secured,
permanent magnet means interposed between said members with a pole of said magnet engaging each of said members,
whereby said members act as pole pieces for said permanent magnet means,
one of said members having a projecting portion extending from the opposite longitudinal edge thereof toward the other of said members,
a duality of gripping members,
said gripping members including opposed sheet metal elements adapted to receive an object to be supported therebetween,
said gripping members having support portions at one side thereof extending toward each other in an overlapping relationship,
each of said support portions including an aperture therethrough,
at least one of said apertures being an elongated transversely extending slot,
a fastener extending through said apertures securing said support portions to said projecting portion of said base,
whereby said support portions are adjustable laterally to vary the spacing between said gripping members
and adjustable angularly to adjust the angle between said gripping members,
and means for controlling the gripping force exerted by said gripping members,
said force controlling means including a duality of spaced individually adjustable members extending through said gripping members adjacent the opposite ends thereof
for limiting the outward travel of said gripping members at said ends and thereby adjusting the gripping effect of said gripping members.

2. A supporting device comprising
a base, said base including
a duality of substantially flat strips of magnetic material,
said strips having longitudinal edges adapted to engage a magnetic object to which said base is to be secured,
a permanent magnet means interposed between said strips with a pole adjacent each of said strips,
whereby said strips act as pole pieces for said permanent magnet means,
and means for holding said strips against said ends of said permanent magnet means,
one of said strips having a portion extending from the opposite longitudinal edge thereof,
said portion projecting inwardly toward the other of said members in a spaced relationship therewith,
a duality of gripping members,
said gripping members being opposed sheet metal elements adapted to receive an object to be supported therebetween,
said elements having support portions extending angularly toward each other and being in overlapping engagement,
each of said support portions including an aperture therethrough,
at least one of said apertures being an elongated transversely extending slot,
a fastener extending through said apertures for securing said support portions to said inwardly projecting portion of said base,
whereby said support portions are adjustable laterally to vary the spacing between said gripping members,
and angularly with respect to each other,
and means for adjusting the gripping force exerted by said gripping members, said force adjusting means including a duality of spaced parallel bolts extending laterally between said gripping members adjacent and outwardly of said support portions of said gripping members,
    whereby said bolts limit the outward travel of said gripping members for thereby adjusting the force exerted thereby.

3. A device as recited in claim 2 in which
said permanent magnet means includes a pair of spaced parallel bar magnets,
    said core pieces having recesses therein receiving the ends of said bar magnets.

References Cited by the Examiner

UNITED STATES PATENTS

| | | | |
|---|---|---|---|
| 1,176,203 | 3/16 | Comer | 248—229 X |
| 2,506,400 | 5/50 | Wietz | 248—206 |
| 2,610,500 | 9/52 | Poupitch | 248—27 |
| 2,807,431 | 9/57 | McHale | 248—229 |
| 2,893,564 | 7/59 | Gearhart | 211—1.2 |
| 2,955,239 | 10/60 | Rouse | 211—1.2 |
| 2,969,418 | 1/61 | Benander | 248—27 |

CLAUDE A. LE ROY, *Primary Examiner.*